United States Patent
Boström et al.

(10) Patent No.: US 11,490,287 B2
(45) Date of Patent: *Nov. 1, 2022

(54) SYSTEM AND METHOD FOR CONGESTION CONTROL IN A COMMUNICATION SYSTEM

(71) Applicant: TELEFONAKTIEBOLAGET LM ERICSSON (PUBL), Stockholm (SE)

(72) Inventors: Lisa Boström, Solna (SE); Marco Belleschi, Solna (SE); Tomas Nylander, Värmdö (SE); Stefan Runeson, Lund (SE); Stefano Sorrentino, Solna (SE); Per Synnergren, Gammelstad (SE); Erik Westerberg, Enskede (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/984,436

(22) Filed: Aug. 4, 2020

(65) Prior Publication Data

US 2020/0367104 A1   Nov. 19, 2020

Related U.S. Application Data

(63) Continuation of application No. 16/099,055, filed as application No. PCT/IB2017/052644 on May 5, 2017, now Pat. No. 10,735,993.

(Continued)

(51) Int. Cl.
*H04W 28/08* (2009.01)
*H04W 36/22* (2009.01)

(Continued)

(52) U.S. Cl.
CPC .............. *H04W 28/08* (2013.01); *H04W 4/40* (2018.02); *H04W 36/22* (2013.01); *H04W 76/10* (2018.02)

(58) Field of Classification Search
CPC ..... H04W 28/08; H04W 36/22; H04W 76/10; H04W 4/40
See application file for complete search history.

(56) References Cited

U.S. PATENT DOCUMENTS

| 5,592,672 A | 1/1997 | Grewal et al. |
| 7,768,917 B2 * | 8/2010 | Nakayama ............ H04L 47/11 370/230.1 |

(Continued)

FOREIGN PATENT DOCUMENTS

| CN | 102209077 B | 11/2013 |
| EP | 2479942 A1 | 7/2012 |
| WO | 2015/004142 A1 | 1/2015 |

OTHER PUBLICATIONS

Interdigital Communications, "UE assisted congestion management based on application type", 3GPP TSG-SA WG1 #59, S1-122179, Jul. 30-Aug. 3, 2012.

(Continued)

*Primary Examiner* — Mohamed A Kamara (57) ABSTRACT

An apparatus, system and method are introduced for controlling a user equipment in a first network with a resource control server. In one embodiment, the resource control server provides instructions over the second network to the user equipment of actions to be taken based at least in part on congestion within the first network.

20 Claims, 9 Drawing Sheets

Related U.S. Application Data (60) Provisional application No. 62/332,107, filed on May 5, 2016.

(51) Int. Cl.
    *H04W 4/40*     (2018.01)
    *H04W 76/10*    (2018.01)

(56) References Cited

U.S. PATENT DOCUMENTS

| | | |
|---|---|---|
| 2011/0287794 A1 | 11/2011 | Koskela et al. |
| 2014/0098672 A1* | 4/2014 | Zhang ................ H04L 47/26 370/236 |
| 2015/0215820 A1 | 7/2015 | Ye |
| 2015/0296411 A1 | 10/2015 | Meyer et al. |
| 2016/0014663 A1* | 1/2016 | Berggren ............. H04W 36/22 455/436 |
| 2016/0119844 A1* | 4/2016 | Uchino ................ H04W 36/22 370/229 |
| 2016/0210859 A1* | 7/2016 | Grotendorst ........... G08G 1/162 |
| 2016/0337239 A1* | 11/2016 | Nasielski ............ H04L 41/5025 |
| 2017/0273016 A1* | 9/2017 | Nagasaka ............. H04W 48/18 |
| 2018/0213379 A1* | 7/2018 | Xiong .................... H04W 4/70 |
| 2018/0242190 A1* | 8/2018 | Khoryaev .............. H04L 47/32 |
| 2018/0242263 A1 | 8/2018 | Lee et al. |
| 2019/0029020 A1 | 1/2019 | Zhao |

OTHER PUBLICATIONS

Interdigital Communications, "Use case for traffic offload based on congestion in a WLAN access", 3GPP TSG-SA WG1 #59, S1-122404, Jul. 30-Aug. 3, 2012.

\* cited by examiner

SYSTEM AND METHOD FOR CONGESTION CONTROL IN A COMMUNICATION SYSTEM

This application is a continuation of U.S. patent application Ser. No. 16/099,055, filed Nov. 5, 2018, and now granted as U.S. Pat. No. 10,735,993 on Aug. 4, 2020, which is a national stage application of International Patent Application No. PCT/IB2017/052644, filed May 5, 2017, which claims the benefit of U.S. Provisional Patent Application No. 62/332,107 entitled "V2X CONGESTION CONTROL," filed May 5, 2016, which are hereby incorporated herein by reference in their entireties.

TECHNICAL FIELD

The present invention is directed, in general, to wireless communication and, more specifically, to a system and method that facilitates vehicle-to-everything (V2X) communication congestion control.

BACKGROUND

The area of Cooperative Intelligent Transport Systems (C-ITS) is in rapid development. C-ITS means that vehicles, road infrastructure and road-traffic authorities exchange and act on various traffic-related information for the purpose of traffic safety (decrease of number of accidents) and traffic efficiency (less congestion, reduced travel times, less pollution and lower cost for infrastructure). The messages to/from cars use radio communication. The cars can exchange information messages over direct radio communication links between the cars or via an intermediate network.

One problem with the current solutions is the limited efficiency with the congestion control. Since each car measures its local environment, it has no direct knowledge about how its transmissions interfere with other users (cars). While low in complexity level, there are many congestion scenarios wherein the distributed congestion control is inefficient. There are also problems with the centralized congestion control as part of a base station (e.g., an eNodeB (eNB) or a eNB type of road side unit (RSU) (eNB-RSU). The problem with the centralized congestion control as part of the eNB is that the centralized congestion control functionality is deployed in a multitude of eNBs and potentially coordinated among eNBs controlled by same and different mobile operator, which adds complexity and cost.

Accordingly, what is needed in the art is a new approach that overcomes the deficiencies associated with the current solutions.

SUMMARY

These and other problems are generally solved or circumvented, and technical advantages are generally achieved, by advantageous embodiments of the present invention, in which an apparatus, system and method are introduced for controlling a user equipment (UE) in a first network with a resource control server. In one embodiment, the resource control server provides instructions over the second network to the user equipment of actions to be taken based at least in part on congestion within the first network.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different FIGUREs generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network node is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice over Internet Protocol (VoIP) phones, user equipment (UE), terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations). One of ordinary skill in the art would realize that any network device, end station or other network apparatus can perform various functions described herein.

Embodiments described herein provide congestion control for a vehicle-to-everything (V2X) system that is expected to be better than the congestion control provided by conventional technologies such as dedicated short-range communications (DSRC). These solutions may provide a congestion control solution that is possible to use with any type of radio access technology, as well as value when outside of network coverage. Embodiments are directed to congestion control that uses not only radio input, but may also take other factors into account. For example, time-sensitive policies can be used based on known traffic patterns. It is also possible to apply machine learning.

Embodiments herein are directed to maintaining efficiency advantages of central congestion control without a need for deployment of centralized congestion control functionality in an eNB or eNB-RSU. This can be achieved by using commercial mobile broadband networks (e.g., Global System for Mobile Communications (GSM), Wideband Code Division Multiple Access (WCDMA), Long Term Evolution (LTE) or others) to communicate congestion instructions over-the-top (OTT) from a central congestion control system (CCS) (also referred to as a resource control system (RCS)) managed by Intelligent Transport System (ITS) spectrum responsible to the individual cars.

Optionally the same mobile networks are used for the cars to report their individual, local measurements of congestion and interference. According to an embodiment, there may be a need to act on a time-scale much larger than individual transmission time intervals (TTIs). Such solutions can perform much better, and at a lower cost, than conventional solutions. Various other features and advantages will become obvious to one of ordinary skill in the art in light of the following detailed description and drawings.

For obvious reasons, the messages to/from cars use radio communication. There are in principle two ways for two cars to exchange information messages, namely, over a direct radio communication link between the cars (method 1) and via an intermediate network (e.g., a commercial mobile broadband network, method 2).

Today, there are two standards for the method (1) above, the IEEE-based standard "DSRC" and the standard-in-making "3GPP V2X" (Third Generation Partnership Program) for 3GPP R13 (Release 13) with improvements in R14 (Release 14), which are incorporated by reference. Dedicated short-range communications ("DSRC") are typically one-way or two-way short-range wireless communication channels between vehicles with a corresponding set of protocols and standards. V2X technology ("vehicle-to-everything technology") embedded in automobiles will enable cars to talk to each other, react to road sensors and maybe humans and animals. The consensus in the industry is that method (1) and method (2) will both be used, either in isolation or in combination. One outstanding problem with method (1) is that when many cars are in the same geographic area, radio communication between the cars presents a risk for mutual radio interference that leads to unreliable communication and eventually the loss of communication capability between the cars with (local) collapse of the C-ITS system.

Embodiments described herein provide innovative solutions to this interference and congestion problem for the direct car-to-car communication using dedicated short range communications or 3GPP V2X. The solutions also work for future similar (e.g., National Security and Public Safety (NSPS)) systems. The solution further applies also to systems where direct communication includes cars to/from road infrastructure.

Figure 1:
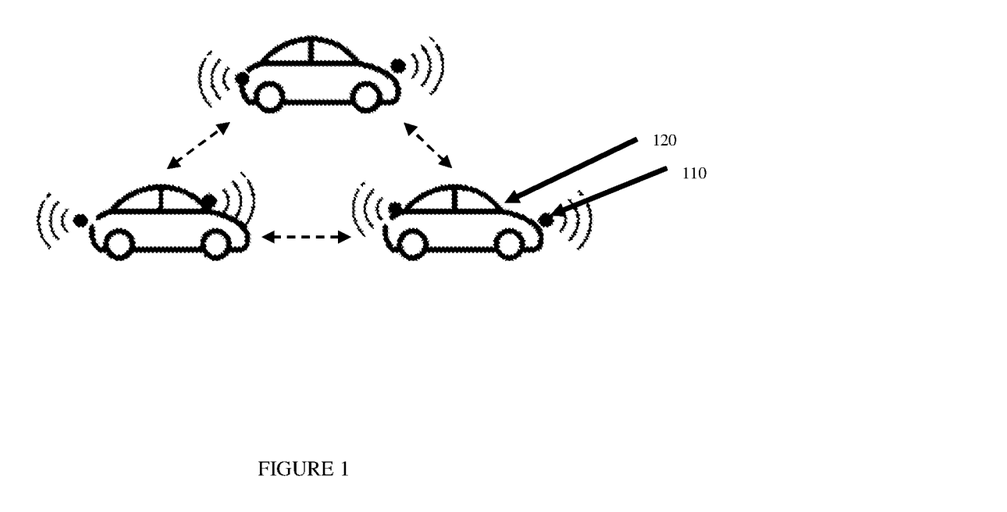
FIGS. 1 to 3 illustrated system level diagrams of embodiments of communication systems.

Turning now to FIG. 1, illustrated is a system level diagram of an embodiment of a communication system. A radio unit 110 in each car such as vehicle (e.g., a car) 120 autonomously measures interference, signal strengths, message collisions, and more, to provide an environment for application of the principles of the present invention. This information is then used in combination with local (within the car 120) congestion algorithms to determine if an action shall be taken by that car to change its transmission patterns for the purpose of releasing congestion.

One problem is the limited efficiency of this type of congestion control. Since each car measures its local environment, it has no direct knowledge about how its transmissions interfere with other users (cars). As one example, a car in the middle of an intersection may find itself severely interfered with by cars in all the incoming streets (which it sees), while each interfering car only sees a subset of the other cars and hence does not detect interference. In this scenario (and in many similar situations), the interfering cars do not detect the congestion and do not take any actions to relieve the congestion. While simple in its design and benefits from a low complexity level in its architecture, there are many congestion scenarios wherein this kind of distributed congestion algorithm is inefficient. In a real system, this translates into lower system capacity, since the system must not be loaded to the level where an unfavorable congestion situation may occur.

Figure 2:
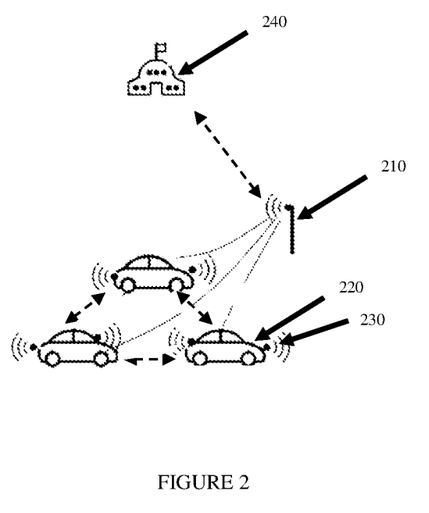

Turning now to FIG. 2, illustrated is a system level diagram of an embodiment of a communication system. The communication system demonstrates centralized congestion control as a part of an eNB or eNB RSU. In DSRC, this function is not specified and, in 3GPP, the central interference/congestion control function is presently assumed to be part of an eNB or eNB-RSU 210. The central interference/congestion control function performs radio resource management for the direct communication link by assigning radio resources to the UEs to mitigate interference. Each car 220 receives the instructions from the eNB or eNB-RSU 210 and adapts its radio communication accordingly. The eNB or eNB-RSU 210 communicates with network or application servers 240 for other purposes.

It can be noted that the second solution, the "centralized congestion control as part of an eNB or eNB RSU" is an extension to how radio-resource management is done in 3GPP systems. The UEs (e.g., UEs in vehicles) report radio-and-buffer status to the eNB and based thereon, the eNB schedules the transmission of each individual UE (vehicle). This solution has proven to be very efficient in systems that have base stations (e.g., eNBs).

There also exist problems with the centralized congestion control as part of an eNB or eNB RSU. The centralized congestion control resolves certain problems inherit in the distributed congestion solution described above. It does so by collecting global information, deriving or estimating which car interferes with other cars and controls the transmission from the central radio resource management function. In one commonly used design, this is done by traditional radio scheduling. Again, the problem with the centralized congestion control as part of the eNB is that the centralized congestion control functionality is deployed in a multitude of eNBs and potentially coordinated among eNBs controlled by same and different mobile operator, which adds complexity and cost.

Figure 3:
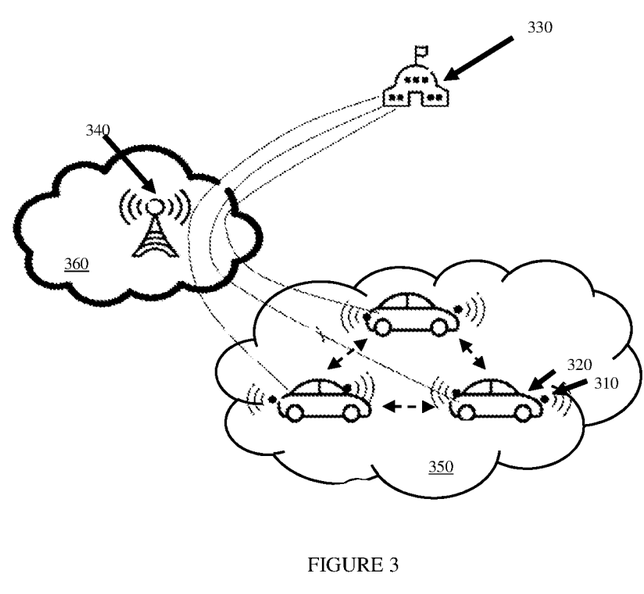

Turning now to FIG. 3, illustrated is a system level diagram of an embodiment of a communication system. As illustrated in FIG. 3, a radio unit 310 in each car such as car 320 communicates with a centralized server 330 employing a cellular access point such as eNB 340 that may provide a commercial mobile broadband network such as GSM, WCDMA, LTE, or other technology. The commercial mobile broadband network communicates congestion instructions over-the-top from a centralized congestion control system in the centralized server 330. The centralized congestion control system may be managed by ITS spectrum responsible to the individual cars. Optionally, the same mobile networks are used for the cars to report their individual, local measurements of congestion and interference. The cars 320 generally communicate with one another of a first network (generally designated 350) and the cars 320 generally communicate with the centralized server 330 via a second network (generally designated 360) in this case including the eNB 340.

Figure 4:
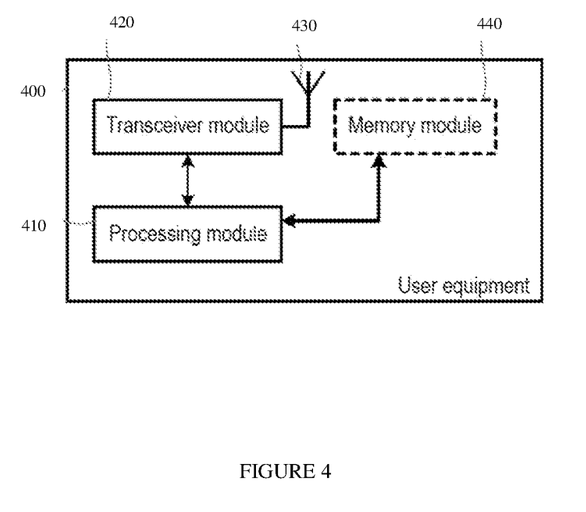
FIG. 4 illustrates a block diagram of an embodiment of a user equipment.

Turning now to FIG. 4, illustrated is a block diagram of an embodiment of a UE 400 (e.g., a wirelessly connected device, such as part of a vehicle). The UE 400 includes a processing module (or processor) 410 that controls the operation of the UE 400. The processing module 410 is connected to a receiver or transceiver module 420 with associated antenna(s) 430, which are used to receive signals from or both transmit signals to and receive signals from a base station (such as the eNB 340 in FIG. 3). To make use of discontinuous reception (DRX), the processing module 410 can be configured to deactivate the receiver or transceiver module 420 for specified lengths of time. The UE 400 also includes a memory module (or memory) 440 that is connected to the processing module 410 and that stores programs and other information and data required for the operation of the UE 400. In some embodiments, the UE 400 may optionally include a satellite positioning system (e.g., global positioning system (GPS)) receiver module that can be used to determine the position and speed of movement of the UE 400.

Figure 5:
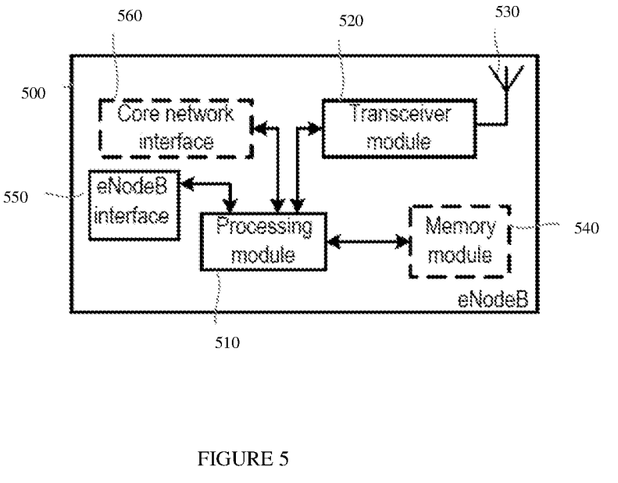
FIG. 5 illustrates a block diagram of an embodiment of a base station.

Turning now to FIG. 5 illustrated is a block diagram of an embodiment of a base station 500 (e.g., a NodeB or an eNodeB, such as the eNB 340 in FIG. 3). It will be appreciated that although a macro eNB will not in practice be identical in size and structure to a micro eNB, for the purposes of illustration, the base stations 500 are assumed to include similar components. Thus, the base station 500 includes a processing module (or processor) 510 that controls the operation of the base station 500. The processing module 510 is connected to a transceiver module 520 with associated antenna(s) 530 that are used to transmit signals to, and receive signals from, mobile devices (e.g., in vehicles) in the network. The base station 500 also includes a memory module (or memory) 540 that is connected to the processing module 510 and that stores program and other information and data required for the operation of the base station 500.

The base station 500 also includes components and/or circuitry 550 for allowing the base station 500 to exchange information with other base stations 500 (for example via an X2 interface) and components and/or circuitry 560 for allowing the base station 500 to exchange information with nodes in the core network (for example via the Si interface). It will be appreciated that base stations for use in other types of network (e.g., Universal Terrestrial Radio Access Network (UTRAN) or Wideband Code Division Multiple Access (WCDMA) radio access network (RAN)) will include similar components to those shown in FIG. 5 and appropriate interface circuitry 550, 560 for enabling communications with the other network nodes in those types of networks (e.g., other base stations, mobility management nodes and/or nodes in the core network). Another user equipment could act as a node, according to certain embodiments.

In some embodiments a more general term "network node" is used and it can correspond to any type of radio network node or any network node, which communicates with a UE and/or with another network node. Examples of network nodes are NodeB, Master eNB (MeNB), Secondary eNB (SeNB), a network node belonging to a Master Cell Group (MCG) or a Secondary Cell Group (SCG), a base station (BS), a multi-standard radio (MSR) radio node such as an MSR BS, an evolved Node B (eNodeB), a network controller, a radio network controller (RNC), a base station controller (BSC), a relay, a donor node controlling relay, a base transceiver station (BTS), an access point (AP), transmission points, transmission nodes, a remote radio unit (RRU), a remote radio head (RRH), nodes in a distributed antenna system (DAS), a core network node (e.g., Mobile Switching Center (MSC)), a Mobility Management Entity (MME), operations and maintenance (O&M), Operation Support System (OSS), Self-Organizing Network (SON), positioning node (e.g., Evolved Servicing Mobile Location Center (E-SMLC), Minimization of Drive Tests (MDT), etc.), and an application server including a congestion (or resource) control server. The aforementioned "network nodes" include the subsystems, or ones thereof, as illustrated and described with respect to FIG. 5.

In some embodiments, the non-limiting terms UE or a wireless device are used interchangeably. The UE herein can be any type of wireless device capable of communicating with a network node or another UE over radio signals. The UE may also be a radio communication device, target device, device to device (D2D) UE, machine type UE or UE capable of machine to machine (M2M) communication, low-cost and/or low-complexity UE, a sensor equipped with UE, tablet, mobile terminals, smart phone, laptop embedded equipped (LEE), laptop mounted equipment (LME), universal serial bus (USB) dongles, Customer Premises Equipment (CPE), an Internet of Things (IoT) device, or a Narrowband IoT (NB-IOT) device, etc. Also in some embodiments, the generic term "radio network node" is used. It can be any kind of a radio network node that may include any of a base station, a radio base station, a base transceiver station, a base station controller, a network controller, a radio network controller (RNC), an evolved Node B (eNB), a Node B, a Multi-cell/multicast Coordination Entity (MCE), a relay node, an access point, a radio access point, a Remote Radio Unit (RRU), and a Remote Radio Head (RRH).

The congestion control server (CCS) (also referred to as a resource control server (RCS) could in one embodiment be located in an application layer server (e.g., managed by the spectrum owner) located outside the radio access network. The CCS could in another embodiment be located in the core network. The CCS may be implemented as a trusted entity and the messages between UE and CCS may be verified using certificates or similar approach. The CCS is functionality implemented in a network node that controls parameters related to traffic generation and/or its radio transmission. Thus, the CCS controls resources/congestion in a communication network (e.g., mobile network) located, for instance, in the core network (e.g., outside the mobile network) and/or in an application layer associated therewith.

The spectrum owner could either be the owner of a licensed spectrum, or in the case of unlicensed spectrum it could be an entity managing the spectrum used for a specific purpose (i.e., dedicated spectrum such as for ITS purposes). An example of a spectrum owner in the context of this disclosure could be Road Traffic Authorities or an operator assigned with task. According to a first embodiment, OTT congestion control is managed by a central entity, herein referred to as the congestion control server (CCS) or resource control server (RCS) as provided herein.

The embodiments that follow are written from a perspective where LTE is used as the radio access technology (hence LTE specific interfaces, protocols and acronyms are used), but the congestion control solution described herein may be implemented as an over-the-top service either in LTE, WCDMA, GSM, IEEE specification 802.11p (e.g., DSRC/ITS-G5), WiFi, 5G (Fifth Generation of a cellular system) or other similar type of networks, which are incorporated herein by reference. In one embodiment, the CCS may provide the UE with policy information about how to behave in case of congestion when outside of macro coverage. The policy may contain information about when (e.g., what triggers/timers to use) the UE should transition to out of coverage mode for congestion control handling. The CCS may also provide the UE with a default behavior for when there is no congestion (such policy may apply regardless of macro coverage). The congestion control function may collect statistics based on typical traffic density at different hours of the day. It can also receive measurement reports from UEs.

Potential functions in the congestion control function include a request for the UE to increase/decrease messages (e.g., Co-operative Awareness Message (CAM)—frequency: 1), either by a specific value or increase/decrease (no defined amount). As an example, the request may stop the CAM temporarily or with longest possible periodicity when the ITS server has concluded that there is a traffic jam and cars are not really moving (so the CAM may be unnecessary in these circumstances). Another function is to request the UE to use a Uu interface for a specific message type (e.g., all Decentralized Environmental Notification Message (DENM) traffic should go on Uu). Another function is to request the UE to use specific resources or pool of resources in PC5 (sidelink) spectrum. Another function is to request the UE to drop certain messages, either until notified to do otherwise, or during a specific duration.

The congestion control may be associated to some geographical information. For instance, the CCS may provide a mapping between geographical position and allowed/preferred traffic and congestion parameters similar to the ones discussed above. Slow moving traffic could be used to understand that congestion is occurring (especially in the future when most cars support PC5). The CCS could inform OEM clouds to distribute congestion control information to vehicles in a certain area. The CCS may receive measurements (e.g., on congestion level based on radio measurements) from a UE. The CCS may then decide about how to handle the congestion in a specific area. The congestion reporting could be done either by a UE or a UE type RSU. It could potentially also be done by an application in a DSRC RSU.

A variant of the solution described below could be that the CCS initiates an Evolved Multimedia Broadcast-Multicast Service/Single-Cell Point-to-Multipoint (eMBMS/SCPTM) broadcast, i.e., provides the content to the mobile network operator (MNO) who will distribute it on the suitable broadcast channel. For this solution to work, the UE provides E-UTRAN Cell External Identification (ECGI) or similar geo-location information to CCS.

In one embodiment, the UE should report congestion periodically (i.e., whether it experiences congestion or not). In another embodiment, the UE concludes that the PC5 congestion is above a certain threshold where this threshold may be, for example, configured by the CCS. As an example, the UE may begin reporting when the channel occupancy of the radio resources is above 50 percent. The reporting from the UE to the CCS takes place on, for instance, the Uu interface (using LTE as an example), while the congestion analyzed/reported is related to the PC5/sidelink/other interface used by the UE.

After taking action from the CCS to reduce congestion, the UE may return to its default ITS behavior (when in a non-congested area) either after a pre-defined/configured amount of time, or after having traveled a pre-defined/configured distance from the location where the congestion reduction action was received. The UE may in one embodiment receive the validity time/distance of the congestion reduction action as part of the message describing the necessary action. The UE may in another embodiment ramp up towards its default behavior similar to transmission control protocol (TCP).

The UE should report to the CCS when it leaves a congested area or when the congestion falls below a certain threshold. The CCS may in one embodiment receive information from other sources (such as other servers or applications) about potential upcoming congestion, e.g., there is a police car coming that will generate a lot of CAM. The CCS may in one embodiment use additional information (i.e., not provided by a UE) from for example other servers (e.g., information about UE density, traffic flow, rush hour, etc.) to do preventive congestion control.

Figure 6:
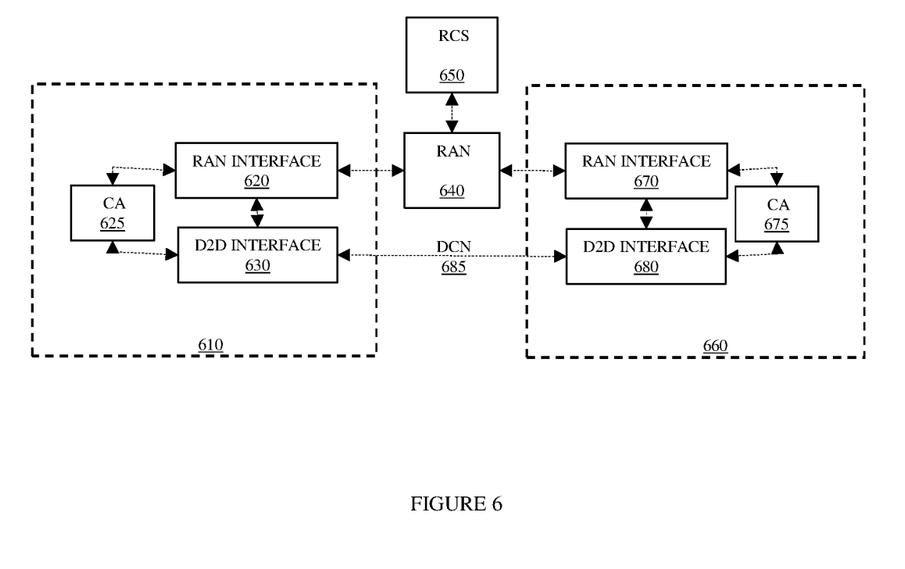
FIG. 6 illustrates a block diagram of an embodiment of a communication system.

Turning now to FIG. 6, illustrated is a block diagram of an embodiment of a communication system. The communication system includes a first UE 610 including a radio access network (RAN) interface 620, a congestion application (CA) 625 and a device-to-device (D2D) interface (e.g., a PC5 interface) 630. The communication system includes a second UE 660 including a RAN interface 670, a CA 675 and a D2D interface (e.g., a PC5 interface) 680. The first and second UEs 610, 660 are coupled to a RAN 640 via the corresponding RAN interfaces 620, 670. The first and second UEs 610, 660 communicate directly through the corresponding D2D interfaces 630, 680. The RAN 640 is also coupled to a resource control server (RCS) 650, again also referred to as a congestion control server. The first and second UEs 610, 660 generally communicate with one another of a first network (e.g., direct communication network (DCN) 685) and the first and second UEs 610, 660 generally communicate with the RCS 650 via a second network (e.g., the RAN 640).

Figure 7:
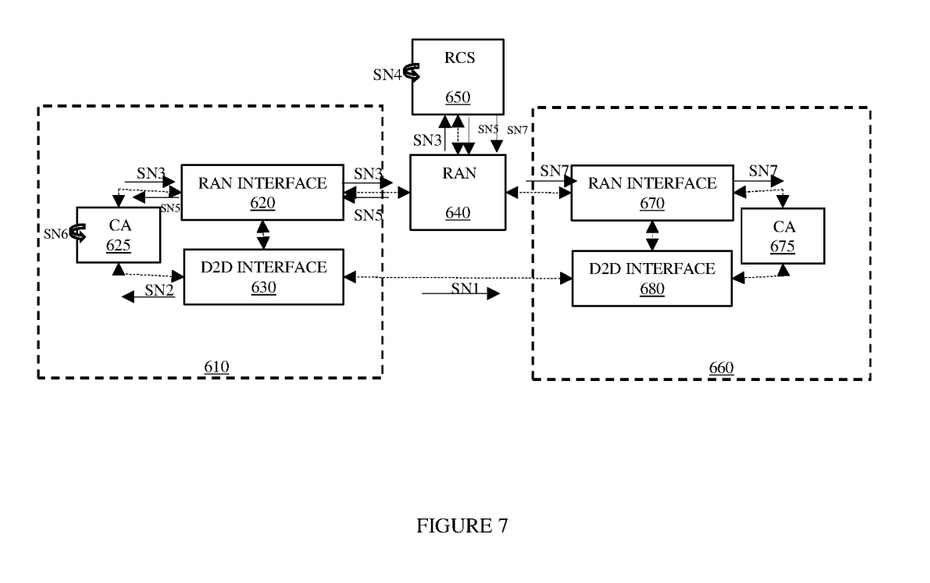
FIG. 7 illustrates the block diagram of the communication system of FIG. 6 demonstrating an example operation thereof.

Turning now to FIG. 7, illustrated is the block diagram of the communication system of FIG. 6 demonstrating an example operation thereof. In the example method that follows, the steps will be illustrated with sequence numbers (SN) within the communication system. With respect to a step SN1, a radio associated with the first UE 610 measures congestion on the D2D interface 630 directed to, in this case, the second UE 660. The CA 625 in the first UE 610 receives the congestion measurements and creates a measurement report, during a step SN2. The CA 625 provides the measurement report to the RCS 650 via the RAN interface 620 and RAN 640, during a step SN3. In doing so, the first UE 610 informs a spectrum owner of congestion via a Uu interface, e.g., real time availability (RTA) cloud (of an RTA server), and its position (for example, but not limited to, longitude/latitude).

The RCS 650 (a related application) analyzes the current congestion situation in a specific area and concludes possible actions that need to be taken by the UEs in this area, during a step general designated SN4. The RCS 650 informs the first UE 610 of actions to be taken in accordance with the CA 625, during a step SN5. The CA 625 of the first UE 610 applies the actions, during a step general designated SN6. In accordance therewith, the first UE 610 adjusts its consumption of the radio resources by, for example, but not limited to, changing message formatting, and/or dropping certain messages (e.g., based on priority or policy) and/or adjusting transmission periodicity/frequency of messages. The spectrum owner's application server (the RCS 650) may inform the first and second UEs 610, 660 (e.g., via OEM clouds) about the congestion and desired actions. The OEM cloud is responsible for pushing the information about changes in the radio resource consumption on PC5 towards their own relevant UEs (e.g., based on location). Thus, the RCS 650 may provide information for radio resource consumption to the CA 675 of the second UE 660 via the RAN 640 and the RAN interface 670 for application by the second UE 660, during a step SN7.

Figure 8:
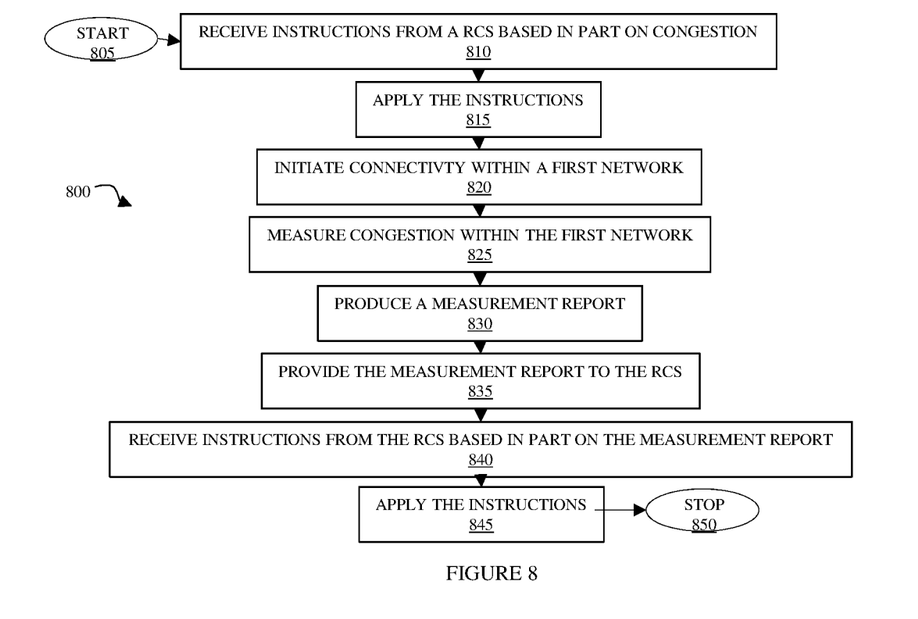
FIG. 8 illustrates a flow diagram of an embodiment of a method of operating a user equipment.

Turning now to FIG. 8, illustrates is a flow diagram of an embodiment of a method 800 of operating a user equipment (for instance, as a part of an onboard communication system of a vehicle). The method 800 begins at a start step of module 805. The method 800 includes receiving instructions (e.g., broadcast) over a second network from a resource control server (RCS) of actions to be taken based at least in part on congestion within the first network in a step or module 810. The user equipment then applies the instructions in a step or module 815.

The user equipment initiates connectivity within the first network in a step or module 820. In a step or module 825, the user equipment measures congestion on a channel of the first network. The user equipment may measure the congestion by measuring channel occupancy of one or more subsets of physical resources associated with the channel. The channel occupancy may be represented by reference signal received power (RSRP), received signal strength indicator (RSSI) or reference signal received quality (RSRQ) associated with said channel. The one or more subsets of physical resources may belong to one or more pool of resources for communication in the first network. The user equipment may measure the congestion by measuring a number of received messages during a period of time.

The user equipment produces a measurement report representing the congestion in a step or module 830. The measurement report may include auxiliary user equipment data such as a location of the user equipment. In a step or module 835, the user equipment provides the measurement report over the second network to the resource control server (e.g., when the congestion passes a congestion threshold). The user equipment stops providing the measurement report when the congestion falls below a congestion threshold. In addition, the measurement report may be provided periodically. The user equipment can provide the measurement report following configuration of the first network and stops providing the measurement report following de-configuration of the first network.

The user equipment receives instructions (e.g., broadcast) over the second network from the resource control server of actions to be taken based at least in part on the measurement report in a step or module 840. The instructions may be based at least in part on another measurement report from another user equipment, wherein the resource control server may receive the another measurement report over a third network from the another user equipment. The user equipment then applies the instructions in a step or module 845. The method 800 ends at a stop step or module 850. It should be understood that ones of the previous steps may be omitted or the steps re-ordered based on the particular application. For instance, the method 800 may terminate following the step 815 described above, or the steps 810, 815 may be omitted depending on the application.

Figure 9:
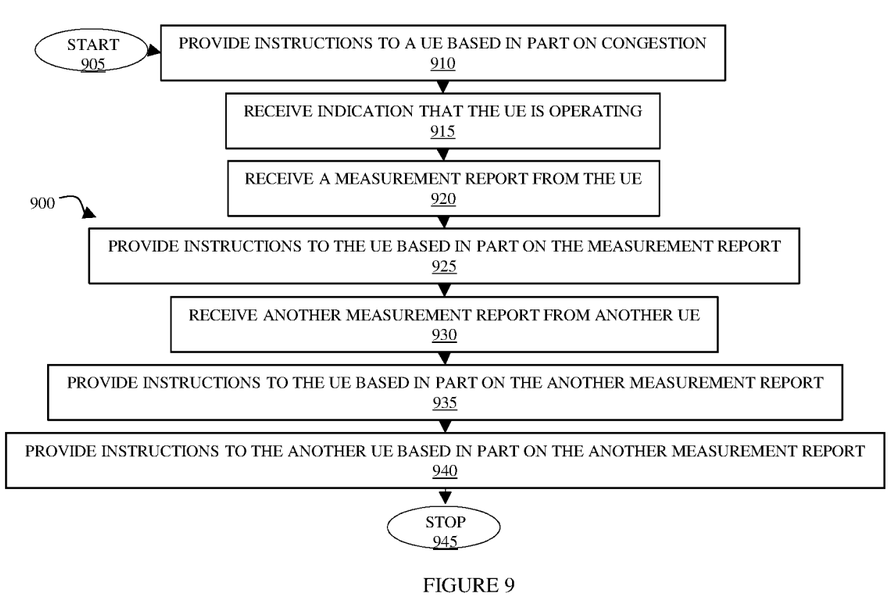
FIG. 9 illustrates a flow diagram of an embodiment of a method of operating a resource control server.

Turning now to FIG. 9, illustrates is a flow diagram of an embodiment of a method 900 of operating a resource control server (RCS). The method 900 of operating the resource control server that controls a user equipment (UE, for instance, as a part of an onboard communication system of a vehicle) in a first network begins at a start step of module 905. The method 900 includes providing instructions (e.g., broadcast) over a second network to the user equipment of actions to be taken based at least in part on congestion within the first network at a step of module 910.

In an embodiment, the user equipment produces a measurement report representing congestion on a channel of the first network. The congestion may be represented by channel occupancy of one or more subsets of physical resources associated with the channel. The channel occupancy may be represented by reference signal received power (RSRP), received signal strength indicator (RSSI) or reference signal received quality (RSRQ) associated with said channel. The one or more subsets of physical resources may belong to one or more pool of resources for communication in the first network. The congestion may be represented by a number of received messages during a period of time.

The method 900 includes receiving an indication over the second network that the user equipment is operating within the first network at a step or module 915. At a step or module 920, the resource control server receives the measurement report over the second network from the user equipment. The measurement report may include auxiliary user equipment data such as a location of the user equipment. The resource control server stops receiving the measurement report when the congestion falls below a congestion threshold. In addition, the measurement report may be received periodically. The resource control server may receive measurement report following configuration of the first network and stops receiving the measurement report following de-configuration of the first network.

The resource control server then provides instructions (e.g., broadcast) over the second network to the user equipment of actions to be taken based at least in part on the measurement report at a step or module 925. At a step or module 930, the resource control server receives another measurement report over from another user equipment (potentially over a third network). The resource control server then provides instructions (e.g., broadcast) over the second network to the user equipment of actions to be taken based at least in part on the another measurement report at a step or module 935. The method 900 also includes providing the instructions (e.g., broadcast) to the another user equipment of actions to be taken based at least in part on the another measurement report at a step or module 940. The method 900 ends at a stop step or module 945. It should be understood that ones of the previous steps may be omitted or the steps re-ordered based on the particular application. For instance, the method 900 may terminate following the step 910 described above, or the step 910 may be omitted, or the steps 930, 935, 940 may be omitted depending on the application.

The instructions mentioned above may be applied to a transmission of an intelligent transport system message over the first network including, without limitation, a cooperative awareness message (CAM), a basic safety message (BSM) or a decentralized environmental notification message (DENM). The instructions may take into account a time of day and/or temporary road work. The instructions may include a congestion control policy including, without limitation, priority levels based on a type of message, modifying a format of a type of message, discarding a type of message, adjusting a transmission periodicity, adjusting a frequency of a type of message, specifying an interface for a type of message, adjusting a message priority pursuant to a road traffic authority, instructing use of a specific resource or pool of resources of the first network (e.g., for a type of message), instructing use of a specific resource or pool of resources in a PC5 spectrum, and behavior when the user equipment is out of range of the second network. The congestion control policy can include different congestion control policies for different levels of congestion.

The first network may accommodate direct communication between the user equipment and another user equipment, and the second network may accommodate cellular communication between the user equipment and the resource control server. The first network may employ unlicensed spectrum for communication between the user equipment and another user equipment, and the second network may employ licensed spectrum for cellular communication between the user equipment and the congestion control server.

As a result of the foregoing embodiments, a congestion control for a V2X system is provided, which is expected to be better than the congestion control provided by conventional technologies, e.g., DSRC. These solutions may provide a congestion control solution that is possible to use with any type of radio access technology, as well as value when outside of network coverage.

While processes in the figures and description may show a particular order of operations performed by certain embodiments of the invention, it should be understood that such order is exemplary (e.g., alternative embodiments may perform the operations in a different order, combine certain operations, overlap certain operations, etc.).

As described above, the exemplary embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. A method of operating a first user equipment of a plurality of user equipments operable in a first network, comprising:
   initiating connectivity with a second user equipment of the plurality of user equipments within the first network, the first network being a first wireless network;
   measuring, by a processor of the first user equipment, congestion on a channel of the first network;
   producing, by the processor of the first user equipment, a measurement report representing the measured congestion;
   transmitting the measurement report over a second network to a resource control server; receiving instructions over the second network from the resource control server of actions to be taken based at least in part on the measurement report, the second network being a second wireless network; and
   applying the instructions to subsequent communication with the second user equipment.

2. The method of claim 1, wherein the measuring congestion comprises measuring channel occupancy of one or more subsets of physical resources associated with the channel, and wherein the channel occupancy is represented by reference signal received power (RSRP), received signal strength indicator (RSSI) or reference signal received quality (RSRQ) associated with the channel.

3. The method of claim 2, wherein the one or more subsets of physical resources belong to one or more pool of resources for communication in the first network.

4. The method of claim 1, wherein the measuring congestion comprises measuring a number of received messages during a period of time.

5. The method of claim 1, wherein the first user equipment provides the measurement report following configuration of the first network and stops providing the measurement report following de-configuration of the first network.

6. The method of claim 1, wherein the first user equipment stops providing the measurement report when the congestion falls below a congestion threshold.

7. The method of claim 1, wherein the first network employs unlicensed spectrum for communication between the first user equipment and the second user equipment, and the second network employs licensed spectrum for cellular communication between the first user equipment and a congestion control server.

8. The method of claim 1, wherein the instructions comprise a congestion control policy that comprises at least one of:
   priority levels based on a type of message,
   modifying a format of a type of message,
   discarding a type of message,
   adjusting a transmission periodicity,
   adjusting a frequency of a type of message,
   specifying an interface for a type of message,
   adjusting a message priority pursuant to a road traffic authority,
   instructing use of a specific resource or pool of resources of the first network,
   instructing use of a specific resource or pool of resources in a sidelink spectrum, and
   behavior when the first user equipment is out of range of the second network.

9. The method of claim 1 wherein said instructions are based at least in part on another measurement report from the second user equipment or a third user equipment of the plurality of user equipments.

10. The method of claim 9 wherein said resource control server receives said another measurement report over a third network from the second user equipment or the third user equipment.

11. The method of claim 1 wherein said first network accommodates direct communication between the first user equipment and the second user equipment, and the second network accommodates cellular communication between the first user equipment and the resource control server.

12. A user equipment operable in a first network, comprising: a processor; and
   a memory including computer program code, wherein the processor, the memory, and the computer program code are collectively operable to:
   initiate wireless connectivity with another user equipment within the first network;
   measure congestion on a channel of a first network;
   produce a measurement report representing the congestion;
   provide the measurement report over the second network to the resource control server; receive instructions over a second network from a resource control server of actions to be taken based at least in part on congestion within the first network, the second network being a second wireless network; and
   apply the instructions to subsequent communication with the other user equipment.

13. The user equipment of claim 12, wherein the user equipment is a part of an onboard communication system of a vehicle.

14. A resource control server controlling a user equipment in a first network, the first network being a first wireless network, comprising:
   a processor; and
   a memory including computer program code, wherein the processor, the memory, and the computer program code are collectively operable to:
   provide instructions, over a second network to the user equipment, for actions to be taken based at least in part on congestion within the first network, the second network being a second wireless network;
   receive an indication over the second network that the user equipment is operating within the first network;
   receive a measurement report over the second network from the user equipment; and
   provide the instructions over the second network to the user equipment for actions to be taken based at least in part on the measurement report when communication with another user equipment within the first network.

15. The resource control server of claim 14, wherein the congestion is represented by channel occupancy of one or more subsets of physical resources associated with the channel.

16. The resource control server of claim 15, wherein the channel occupancy is represented by reference signal received power (RSRP), received signal strength indicator (RSSI) or reference signal received quality (RSRQ) associated with the channel.

17. The resource control server of claim 15, wherein the one or more subsets of physical resources belong to one or more pool of resources for communication in the first network.

18. The resource control server of claim 14, wherein the congestion is represented by a number of received messages during a period of time.

19. The resource control server of claim 14, wherein the first network employs unlicensed spectrum for communication between the user equipment and another user equipment, and the second network employs licensed spectrum for cellular communication between the user equipment and a congestion control server.

20. The resource control server of claim 14, wherein said instructions are applied to a transmission of an intelligent transport system message over said first network, wherein said intelligent transport system message comprises a cooperative awareness message (CAM), a basic safety message (BSM) or a decentralized environmental notification message (DENM).

* * * * *